United States Patent
Sugiyama et al.

(10) Patent No.: US 6,908,693 B2
(45) Date of Patent: Jun. 21, 2005

(54) SN-BASED METAL-COATED STEEL STRIP EXCELLENT IN APPEARANCE AND PROCESS FOR PRODUCING SAME

(75) Inventors: Seiji Sugiyama, Kitakyushu (JP); Teruaki Izaki, Kitakyushu (JP); Masao Kurosaki, Kitakyushu (JP); Yasuto Goto, Kitakyushu (JP); Yusho Oyama, Kitakyushu (JP); Tomohide Kamiyama, Kitakyushu (JP)

(73) Assignee: Nippon Steel Corporation, Tokyo (JP)

( * ) Notice: Subject to any disclaimer, the term of this patent is extended or adjusted under 35 U.S.C. 154(b) by 154 days.

(21) Appl. No.: 10/615,660

(22) Filed: Jul. 9, 2003

(65) Prior Publication Data

US 2004/0048093 A1 Mar. 11, 2004

(30) Foreign Application Priority Data

Sep. 10, 2002 (JP) ........................ 2002-263562
Dec. 27, 2002 (JP) ........................ 2002-381523

(51) Int. Cl.$^7$ .......................... B32B 15/18; C23C 2/30; C23C 2/08; C23C 2/02
(52) U.S. Cl. ..................... 428/648; 428/679; 428/939; 427/433
(58) Field of Search .................. 428/648, 679, 428/687, 612, 939, 935; 427/433, 405, 305, 328, 329

(56) References Cited

U.S. PATENT DOCUMENTS

| | | | |
|---|---|---|---|
| 5,491,035 A | | 2/1996 | Carey, II et al. |
| 5,491,036 A | | 2/1996 | Carey, II et al. |
| 5,597,436 A | * | 1/1997 | Ooyagi et al. ............... 156/259 |
| 5,616,424 A | * | 4/1997 | Carey et al. ................. 428/647 |
| 6,652,990 B2 | * | 11/2003 | Carey et al. ................. 428/647 |
| 2003/0070731 A1 | * | 4/2003 | Petitjean et al. ............. 148/284 |
| 2004/0185261 A1 | * | 9/2004 | Umino et al. ................ 428/418 |

FOREIGN PATENT DOCUMENTS

| | | |
|---|---|---|
| EP | 0 763 608 A1 | 3/1997 |
| JP | 7-207841 | 8/1995 |
| JP | 08-060326 | * 3/1996 |
| JP | 8-269733 | 10/1996 |
| JP | 8-325692 | 12/1996 |
| JP | 9-3658 | 1/1997 |
| JP | 2000-119833 | * 4/2000 |
| JP | 2001-355051 | * 12/2001 |
| JP | 2002-105615 | * 4/2002 |

OTHER PUBLICATIONS

Translation of Japanese publication 07–207841, published Aug. 1995.*
Translation of Japanese publication 08–269733, published Oct. 1996.*
Translation of Japanese publication 08–325692, published Dec. 1996.*
Translation of Japanese publication 09–003658, published Jan. 1997.*
Patent Abstracts of Japan, Japanese Unexamined Patent Publication No. 2000–119833, Apr. 25, 2000.
Patent Abstracts of Japan, Japanese Unexamined Patent Publication No. 08–060326, Mar. 5, 1996.

* cited by examiner

Primary Examiner—John J. Zimmerman
(74) Attorney, Agent, or Firm—Kenyon & Kenyon (57) ABSTRACT

A Sn-based metal-coated steel strip excellent in appearance comprises a Ni-based metal (such as Ni, a Ni—Sn alloy, a Ni—Zn alloy, a Ni—Fe alloy and a Ni—Co alloy) preplating layer and a Sn-based metal (such as a Sn—Zn alloy) coating formed thereon, and is characterized in that a Ni emission intensity line and an Fe emission intensity line obtained by glow discharge spectroscopy of the surface of the coated steel strip satisfy a relationship of the formula: $T1 \geq T2$ wherein T1 is a sputtering time at the peak of a Ni emission intensity line, and T2 is a sputtering time at the inflection point of an Fe emission intensity line, or a relationship of the formulas: $T1 \geq T2$, and $1 \leq T1/T2 \leq 1.5$

8 Claims, 9 Drawing Sheets

SN-BASED METAL-COATED STEEL STRIP EXCELLENT IN APPEARANCE AND PROCESS FOR PRODUCING SAME

BACKGROUND OF THE INVENTION

1. Field of the Invention

The present invention relates to a Sn-based metal-coated steel strip having a beautiful surface state without uneven luster, and being excellent in appearance.

2. Description of the Related Art

Because Sn-based metal-coated steel strips are excellent in corrosion resistance and can be produced at low cost, they have been widely used as components of various products used in corrosive environments. Therefore, many Sn-based metal-coated steel strips excellent in corrosion resistance and many processes for producing the same have heretofore been proposed.

Japanese Unexamined Patent Publication (Kokai) No. 7-207841 discloses a low-reflecting highly corrosion-resistant coated metal materials having a two-phase Sn—Zn metal coating containing at least 15 wt. % of Sn and at least 65 wt. % of Zn. The coated metal materials include a coated metal material having a thin nickel layer and a two-phase Sn—Zn metal coating formed thereon. The coated metal materials are used as architectural materials having corrosion resistance and good color tone.

The specification of U.S. Pat. No. 5,491,035 (published in 1996) discloses a coated steel strip excellent in corrosion resistance and coated with a two-phase Sn—Zn alloy layer, by hot dip coating, on an optionally formed nickel layer. The coated steel strip has a non-lustrous color tone on the surface and is used as an architectural material.

Architectural materials, and architectural external materials in particular, have recently been required to have no uneven luster on their surfaces in order to ensure good appearance and color tone, or to ensure a good color tone and good aesthetic appearance. However, suppressing the manifestation of the uneven luster in the above architectural materials has never been considered.

Japanese Unexamined Patent Publication (Kokai) No. 8-269733 discloses, as a Sn-based metal-coated steel strip for other applications, a highly corrosion-resistant rust-preventive steel strip for fuel tanks wherein a Sn—Zn alloy coating layer 4 to 50 $\mu$m thick is formed on an alloy layer up to 2 $\mu$m thick and containing at least one of Ni, Fe, Zn and Sn, and the zinc grain size in the coating layer is defined.

The rust-preventive steel strip for fuel tanks is excellent in various properties necessary for fuel tanks.

Further, Japanese Unexamined Patent Publication (Kokai) No. 8-325692 discloses a rust-preventive steel strip for fuel tanks wherein a coating layer, which is composed of a Sn—Zn alloy and in which the major axis size of the coating metal grains on the uppermost surface is defined, is formed on an alloy layer up to 2.0 $\mu$m thick.

The alloy layer of the rust-preventive steel strip for fuel tanks contains at least 0.5% of at least one of Ni, Co and Cu, and the steel strip is excellent in stamping formability, corrosion resistance and weldability, and can withstand soured gasoline over a long period of time.

Furthermore, Japanese Unexamined Patent Publication (Kokai) No. 9-3658 discloses a rust-preventive steel strip for fuel tanks having a Sn-based alloy coating layer 2.0 to 15.0 $\mu$m thick formed on an alloy layer, 0.05 to 1.5 $\mu$m thick, containing at least 50% of Fe and Sn, and further having an organic-inorganic composite film formed on the alloy coating layer.

The rust-preventive steel strip for fuel tanks has a Ni plating layer, in a necessary amount, as a substrate plating layer, is excellent in stamping formability, corrosion resistance and weldability, and can withstand soured gasoline over a long period of time as can the rust-preventive steel strip for fuel tanks described in the patent reference 3.

However, suppressing the manifestation of an uneven luster caused by the non-uniformity of the surface properties in the coating layer was not considered in any of the above rust-preventive steel strips for fuel tanks.

Although the uneven luster, especially, does not impair properties of the coating layers such as corrosion resistance and workability, it impairs the appearances and color tone of the steel strips, or the color tone and aesthetic appearance after painting. Therefore, manifestation of uneven luster on the steel strips must be suppressed.

Although manifestation of an uneven luster is considered to depend on the coating methods and coating conditions, no coating method for solving the problem of the uneven luster has ever been proposed.

The specification of U.S. Pat. No. 5,491,036 (published in 1996) discloses a non-lustrous, corrosion-resistant coated steel strip having an ultra-thin intermediate nickel layer applied to the surface of the strip and a coating of two-phase Sn—Zn alloy layer formed thereon by a hot dipping process and a process for producing the same.

The specification further discloses, regarding the formation of the two-phase Sn—Zn alloy layer, the formation of an alloyed layer between the alloy layer and the base steel strip, which results in a strong bond therebetween.

However, no disclosure has ever been made of the relationship between the alloyed layer and the texture of the two-phase Sn—Zn alloy layer that influences the manifestation of uneven luster.

Furthermore, the specification of U.S. Pat. No. 5,491,036 discloses one embodiment wherein coating rollers contacted with the surface of a molten coating bath and holding a coated steel strip from both sides are arranged, and the molten coating layer thickness is controlled and non-coated portions are coated by the rollers during withdrawing the coated steel strip from the molten coating bath. However, means for suppressing the manifestation of the uneven luster has never been disclosed.

As explained above, although users have strictly required the solution of the problem of the uneven luster on Sn-based metal-coated steel strips in recent years, neither the coating methods, nor the coated steel strips that solve the problem of the uneven luster have ever been proposed.

SUMMARY OF THE INVENTION

In view of the above requirements, the present invention is intended to provide a Sn-based metal-coated steel strip having no uneven luster, a beautiful surface state and an excellent appearance.

A Sn-based metal-coated steel strip is produced by coating the surface of a steel strip having been preplated with a Ni-based metal (such as Ni, a Ni—Sn alloy, a Ni—Zn alloy, a Ni—Fe alloy or a Ni—Co alloy) with a flux, and immersing in a Sn-based metal coating bath.

However, uneven luster (poor surface quality) is sometimes manifested on the coating layer surface.

The uneven luster is thought to form when the non-uniformity of the composition and structure in the interior of the coating layer reaches the surface.

The present inventors have therefore analyzed, first, the element distribution in the coating layer including the preplating layer by glow discharge spectroscopy (GDS), and then investigated the relationship between the analysis results and the uneven luster.

As a result, we have found that no uneven luster is manifested on the surface of the coating layer where the sputtering time (T1) at the peak of a Ni emission intensity line is larger than the sputtering time (T2) at the inflection point of an Fe emission intensity line.

Furthermore, based on the above discovery, the present inventors have examined a procedure for obtaining a coating layer that shows a sputtering time (T1) at the peak of a Ni emission intensity line larger than a sputtering time (T2) at the inflection point of an Fe emission intensity line.

As a result, the discovery explained below has been made. One stabilizing roll is arranged below the bath surface of the Sn-based metal coating bath, or at least two stabilizing rolls are arranged therebelow in a zigzag pattern at an upper position and a lower position, respectively, and the coated steel strip is withdrawn from the coating bath while the stabilizing roll or rolls are rotated at a peripheral speed differing from the passing speed of the coated steel strip.

Then when the roll or rolls are then contacted with the surface of the coated steel strip, namely, the coating layer including the Ni preplating layer, the sputtering time (T1) at the peak of a Ni emission intensity line can be made larger than the sputtering time (T2) at the inflection point of an Fe emission intensity line.

The present invention is based on the above discovery, and the aspects of the invention are as explained below.

(1) A Sn-based metal-coated steel strip excellent in appearance comprising a Ni-based metal preplating layer and a Sn-based metal coating formed thereon, and being characterized in that a Ni emission intensity line and an Fe emission intensity line obtained by glow discharge spectroscopy of the surface of the coated steel strip satisfy a relationship of the formula (1):

$$T1 \geq T2 \quad (1)$$

wherein T1 is a sputtering time at the peak of a Ni emission intensity line, and T2 is a sputtering time at the inflection point of an Fe emission intensity line.

(2) The Sn-based metal-coated steel strip excellent in appearance according to (1) described above, wherein T1 and T2 further satisfy a relationship of the formula (2):

$$1 \leq T1/T2 \leq 1.5 \quad (2)$$

(3) The Sn-based metal-coated steel strip excellent in appearance according to (1) or (2) described above, wherein the Ni-based metal is a metal selected from the group consisting of Ni, Ni—Sn alloys, Ni—Zn alloys, Ni—Fe alloys and Ni—Co alloys.

(4) The Sn-based metal-coated steel strip excellent in appearance according to any one of (1) to (3) described above, wherein the Sn-based metal is a Sn—Zn-based alloy.

(5) The Sn-based metal-coated steel strip excellent in appearance according to any one of (1) to (4) described above, wherein the Sn-based metal-coated steel strip is an extremely low carbon one.

(6) The Sn-based metal-coated steel strip excellent in appearance according to any one of (1) to (5) described above, wherein the Sn-based metal-coated steel strip is for fuel tank materials.

(7) The Sn-based metal-coated steel strip excellent in appearance according to any one of (1) to (5) described above, wherein the Sn-based metal-coated steel strip is for materials for electrical appliances.

(8) The Sn-based metal-coated steel strip excellent in appearance according to any one of (1) to (5) described above, wherein the Sn-based metal-coated steel strip is for architectural materials.

DESCRIPTION OF THE PREFERRED EMBODIMENTS

The present invention will be explained in detail.

The Sn-based metal-coated steel strip having no uneven luster of the present invention (hereinafter sometimes referred to as "the coated steel strip of the invention") can be produced by a coating apparatus illustrated in FIG. 1.

In the above coating apparatus, a Ni-based metal-preplated steel strip (hereinafter sometimes referred to as "the preplated steel strip") 3a that has been preplated with a Ni-based metal with a necessary thickness is coated with a flux on both sides by a flux application apparatus 8, and fed into a Sn-based metal coating bath 2 placed in a coating bath 1.

In addition, examples of the flux include an aqueous solution of one or at least two compounds selected from the group consisting of $ZnCl_2$, $NH_4Cl$, $SnCl_2$, HCl and NaCl.

The Ni-based metal with which the steel strip surface is preplated is Ni or a Ni-based alloy. The Ni-based alloy can be selected from the group consisting of Ni—Sn alloys, Ni—Zn alloys, Ni—Fe alloys and Ni—Co alloys.

In addition, the steel strip is preplated with a Ni-based metal principally by electroplating. However, other plating procedures may also be employed as long as plating is conducted to form a preplating layer.

Furthermore, the Sn-based metal with which the preplated steel strip is coated is Sn or a Sn-based alloy. Although the Sn-based alloy is not restricted to a specific alloy, a Sn—Zn-based alloy is preferred in view of ensuring excellent corrosion resistance.

A steel strip to be coated may have a composition and mechanical properties in accordance with its application (e.g., fuel tank materials, materials for electrical appliances, architectural materials, materials for other applications and the like). A steel strip having a necessary surface roughness (e.g., from 0.8 to 2.5 μm in terms of Ra) is preferred in view of ensuring close bonding between the coating layer and the base steel.

When an extremely low carbon steel strip is used as a steel strip to be coated, a coated steel strip having no uneven luster and excellent in stamping formability can be produced.

In the apparatus illustrated in FIG. 1, a preplated steel strip 3a is passed through a flux layer 9 in a flux region 7 partitioned with a weir 6, immersed in a Sn-based metal coating bath 2, turned by a pot roll 4 arranged at the bottom of a coating bath 1, and withdrawn from the bath as a Sn-based metal-coated steel strip (hereinafter sometimes referred to as "the coated steel strip") 3.

The surface of the preplated steel strip 3a is covered with the flux when the steel strip is passed through the flux layer 9, and the flux removes oxides on the steel strip surface to activate the strip surface. The reaction of the activated surface and the Sn-based metal coating bath 2 forms a coating on the steel strip.

In the above coating apparatus, stabilizing rolls 5a, 5b are arranged at predetermined upper and lower positions, respectively, below the bath surface of the Sn-based metal coating bath 2.

The stabilizing rolls 5a, 5b are usually arranged so that the position of the coated steel strip is stabilized to regulate the amount of the coating, and to make the amount of the coating in the transverse direction of the coated steel strip uniform.

In the present invention, the stabilizing rolls 5a, 5b are rotated at a peripheral speed different from the passing speed of the coated steel strip 3, pushed against the withdrawing (passing) line with a given distance, whereby the rolls are contacted with the surface of the coated steel strip 3 in the course of being withdrawn, namely, specifically contacted with the preplating layer and/or the coating layer formed thereon.

In order to obtain a desired coating layer, a pushing amount of the stabilizing roll (an overlapped width of the rolls when a pair of an upper roll and a lower roll are employed) is suitably adjusted in accordance with the diameter and peripheral speed of the stabilizing rolls, the type of the Ni-based metal, the type of the Sn-based metal and other coating conditions.

In the present invention, a Sn-based metal-coated steel strip having a beautiful surface state without uneven luster and excellent in appearance can be produced by contacting the stabilizing rolls rotating at a peripheral speed different from the passing speed of the coated steel strip with the preplating layer and/or the coating layer being formed thereon.

Figure 2:
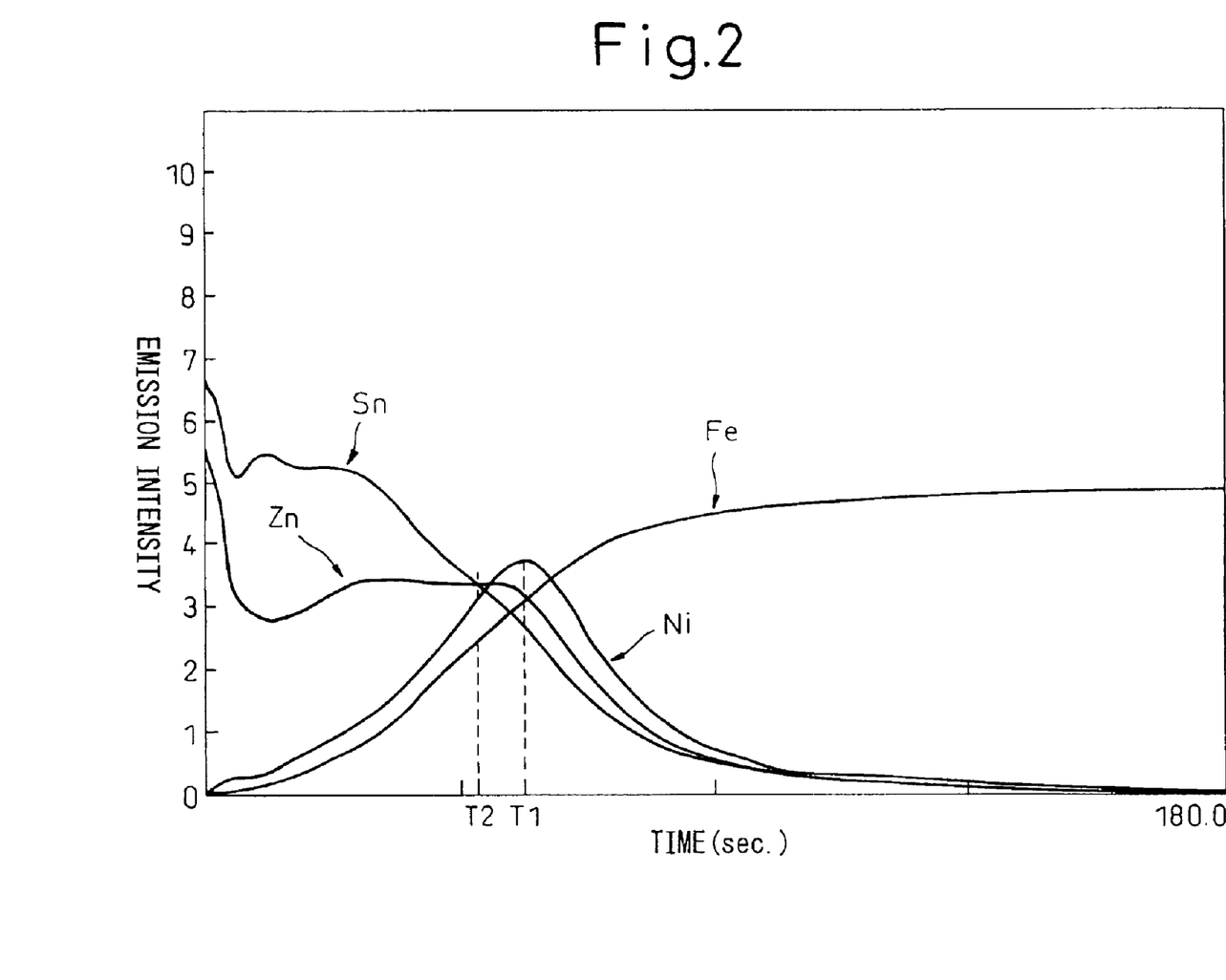
FIG. 2 is a graph showing the results of glow discharge spectroscopy (emission intensity line) associated with the coating layer of a coated steel strip having no uneven luster.

FIG. 2 shows one example of the emission intensity lines obtained by analyzing the coating layer of a coated steel strip of the present invention by glow discharge spectroscopy.

Figure 3:
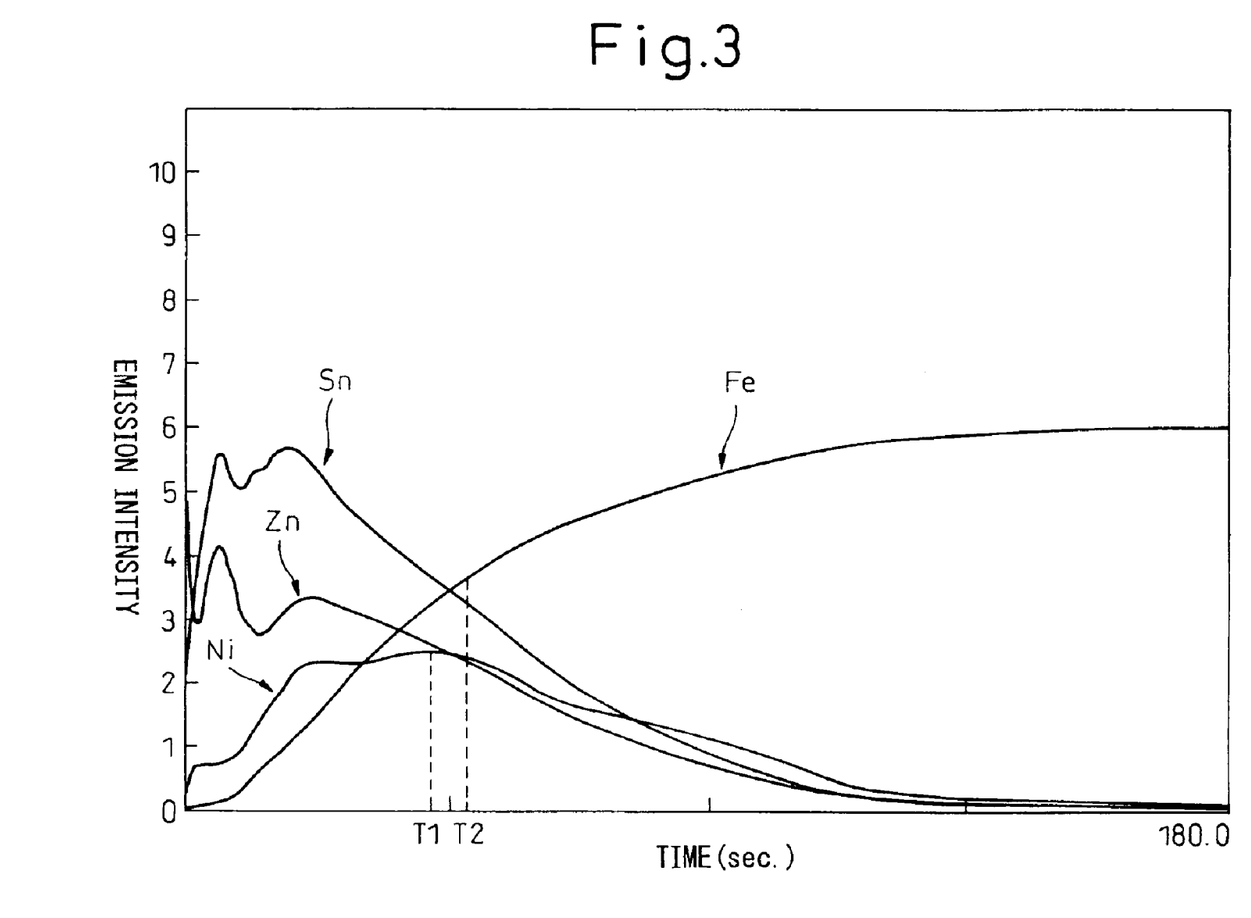
FIG. 3 is a graph showing the results of glow discharge spectroscopy (emission intensity line) associated with the coating layer of a coated steel strip having uneven luster.

On the other hand, FIG. 3 shows one comparative example of the emission intensity lines obtained by analyzing, by glow discharge spectroscopy, the coating layer of a coated steel strip with uneven luster obtained by conventionally coating with a Sn-based metal.

Glow discharge spectroscopy (GDS) is a procedure for analyzing element distributions in the depth direction in a given analysis area, and is an appropriate one for accurately and quantitatively analyzing the element distributions in the depth direction of a coating layer.

In addition, the emission intensity lines shown in FIGS. 2 and 3 were obtained with a glow discharge spectroscopy apparatus (GDLS-5017 type, manufactured by Shimadzu Corporation) under the following conditions: a vacuum degree of 60 Pa; a measurement current of 30 mA; data plots of 600 points; a total time of 180 sec (600 points×2.5 msec/data×120 data/point [in which 2.5 msec is a time interval for obtaining another data after obtaining one data], a measured area of a circle 4 mm in diameter).

A glow discharge spectroscopy apparatus and measurement conditions used in the present invention are not restricted to the apparatus and conditions mentioned above.

It can be understood from the emission intensity lines shown in FIGS. 2 and 3 that in contrast to the sputtering time (T1) at the peak of a Ni emission intensity line that is smaller than a sputtering time (T2) at the inflection point of an Fe emission intensity line for a coated steel strip having uneven luster (see FIG. 3), the sputtering time (T1) at the peak of a Ni emission intensity line is larger than the sputtering time (T2) at the inflection point of an Fe emission intensity line in a coated steel strip of the invention (see FIG. 2).

In addition, the inflection point of an emission intensity line is determined by a conventional mathematical procedure.

The magnitude relationship between the sputtering times T1 and T2 is characteristic to the coated steel strip of the present invention.

That is, satisfying the following formula is a characteristic requirement for the coated steel strip of the present invention:

$$T1 \geq T2 \tag{1}$$

wherein T1 is a sputtering time at the peak of a Ni emission intensity line, and T2 is a sputtering time at the inflection point of an Fe emission intensity line.

Moreover, for the coated steel strip of the invention, in order to more surely suppress the manifestation of uneven luster, T1 and T2 mentioned above preferably satisfy further the following formula:

$$1 \leq T1/T2 \leq 1.5 \tag{2}$$

When the T1/T2 ratio is less than 1, uneven luster is markedly manifested. On the other hand, when the T1/T2 ratio exceeds 1.5, uneven luster that is hardly confirmed by visual observation is sometimes manifested.

In the process for producing the coated steel strip of the invention satisfying the above formulas (1) and (2) (hereinafter sometimes referred to as the production process of the present invention), during passing of the coated steel strip in the coating bath, one or at least two stabilizing rolls arranged below the level of the coating bath are rotated at a peripheral speed different from the passing speed of the coated steel strip, and contacted with the surface of the coated steel strip, namely, specifically contacted with the preplated layer and/or the coating layer being formed thereon to give the coated steel strip.

A speed difference between the peripheral speed of the stabilizing rolls and the passing speed of the coated steel strip is suitably adjusted in accordance with the type of a Ni-based metal, that of a Sn-based metal and other coating conditions.

According to the experimental results to be described later of the present inventors, the peripheral speed of the stabilizing rolls is preferably from 10 to 90% or at least 120%, more preferably from 50 to 90% or from 120 to 150% of the passing speed.

Because the above speed difference is suitably designed within the scope of the driving system capacity of the coating apparatus, there is no necessity to specifically define the upper limit.

The stabilizing rolls are made to have a necessary peripheral speed in a coating bath at about 300° C., and contacted with the coated steel strip that is transferred at a speed different from the peripheral speed.

Moreover, the surface of the stabilizing rolls greatly influences the adhesion state of a flux on the strip that may cause uneven luster. The stabilizing rolls must therefore be made to have a necessary surface hardness and a necessary surface roughness.

Figure 1:
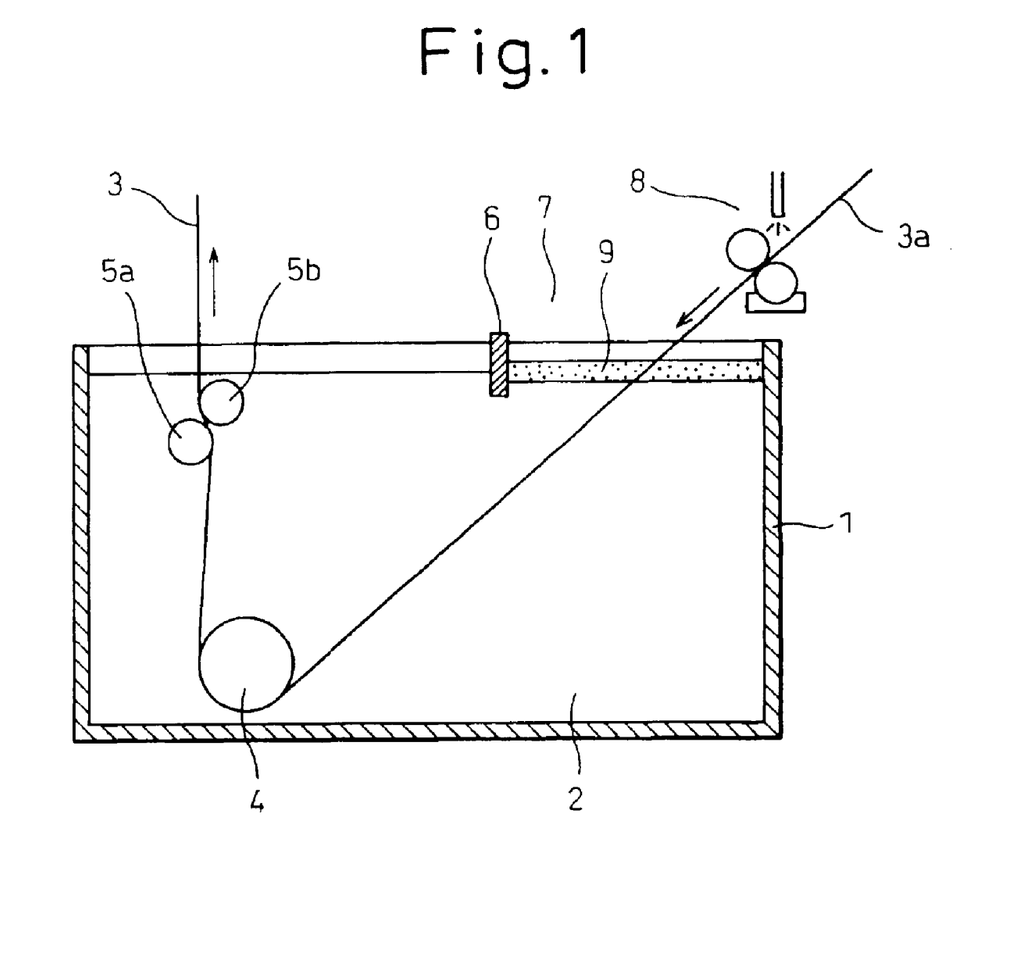
FIG. 1 is a schematic view illustrating the structure of a coating apparatus for producing a Sn-based metal-coated steel strip.

The present inventors variously altered the surface roughness and surface hardness of the stabilizing roll 5a in the coating apparatus shown in FIG. 1, and investigated the relationship between the surface roughness (Ra: 0.03 to 0.1 $\mu$m) and surface hardness (Hv: 120 to 1,050) and the state of flux adhesion to the roll surface and the coating appearance.

A steel strip 3a was coated under the following conditions: an aqueous solution of $ZnCl_2+NH_4Cl$ was used as a flux; the plated steel strip 3a was passed at a passing speed of 50 m/min; the peripheral speed of the stabilizing rolls 5 was set at 50% of the passing speed of the plated steel strip 3a; and the plated steel strip 3a was immersed in the Sn—Zn alloy bath at 300° C.

Figure 8:
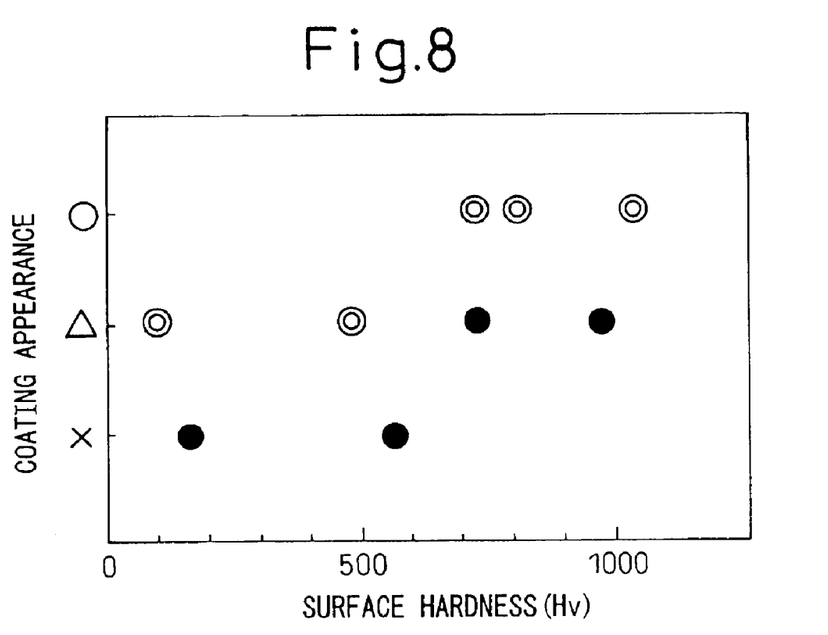
FIG. 8 is a graph showing the relationship between the surface hardness of a stabilizing roll and the coating appearance.
Figure 9:
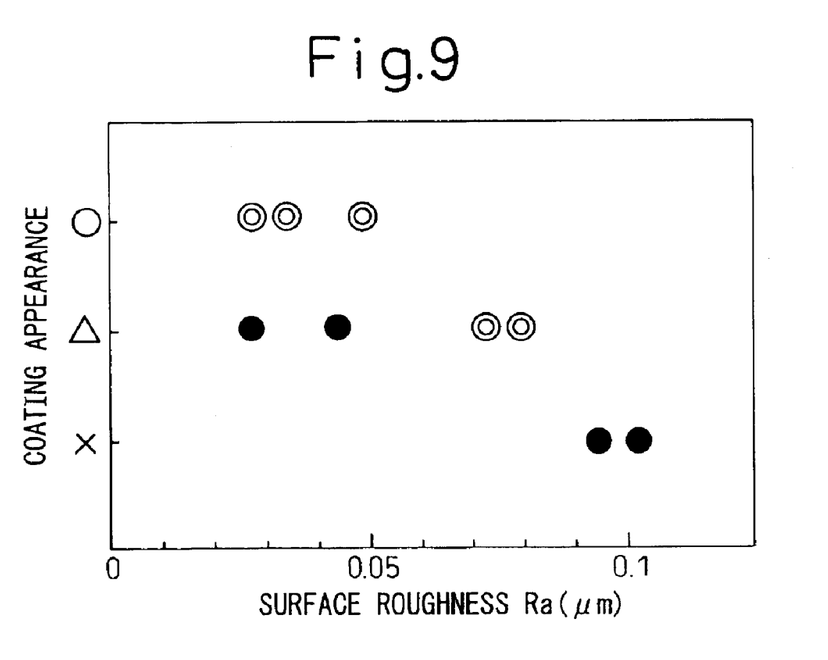
FIG. 9 is a graph showing the relationship between the surface roughness of a stabilizing roll and the coating appearance.

The appearance of the coated steel strip-thus obtained was observed. FIGS. 8 and 9 show the results thus obtained.

A good coating appearance was evaluated as ○. A coating appearance with intermittent poor portions was evaluated as Δ. A coating appearance with continuous poor portions was evaluated as x.

In addition, in FIG. 8, the mark ⊚ indicates that the roll surface roughness Ra was up to 0.05 $\mu$m, and the mark ● indicates that Ra exceeded 0.05 $\mu$m. Moreover, in FIG. 9, the mark ⊚ indicates that the roll surface hardness Hv was at least 750, and the mark ● indicates that Hv was less than 750.

When the surface hardness of the stabilizing rolls is low, damaged depressed portions are formed on the roll surface, or the roll surface is roughened when used for a long time. As a result, flux drawn in the coating bath adheres to the steel strip surface to cause uneven luster. The surface hardness Hv of the stabilizing rolls is preferably at least 750.

When the surface roughness of the stabilizing rolls is large, flux drawn in the coating bath tends to adhere to the roll surface to cause uneven luster of the coated steel strip. Accordingly, the surface roughness Ra of the stabilizing rolls is preferably up to 0.05 $\mu$m.

Rolls prepared by, for example, thermally spraying WC-Co on the surface can be used as the stabilizing rolls mentioned above. Further, the thermally sprayed surface of the stabilizing rolls can be ground with a grinding stone such as diamond grinder to have a surface roughness Ra of up to 0.05 $\mu$m.

During the production of the coated steel strip of the invention, one or at least two stabilizing rolls arranged below the coating bath are rotated, as explained above, at a peripheral speed different from the passing speed of the coated steel strip, and contacted with the surface of the coated steel strip, namely, specifically contacted with the preplated layer and/or the coating layer being formed thereon.

Figure 10:
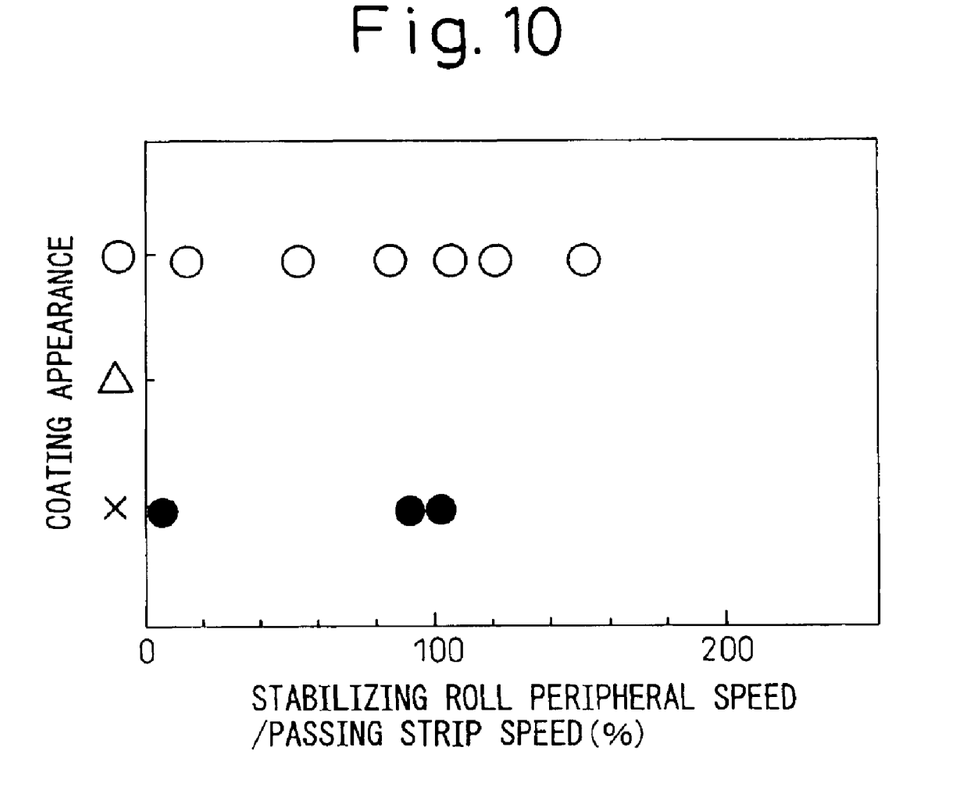
FIG. 10 is a graph showing the relationship between the stabilizing roll peripheral speed/passing strip speed ratio and the coating appearance.

FIG. 10 shows the relationship between "the (stabilizing roll peripheral speed)/(coated steel strip passing speed) ratio (%)" and the coating appearance in a case of using a stabilizing roll which has a surface roughness Ra of 0.05 $\mu$m and a surface hardness Hv of 1050.

In addition, evaluation of the coating appearance is similar to that in FIGS. 8 and 9. The mark ○ indicates that the coating appearance is good. The mark Δ indicates that the coated steel strip has intermittently formed poor coating portions or uneven coating portions. The mark x indicates that the coated steel strip has continuously formed poor coating portions, continuous uneven coating portions or defects.

As explained above, when the peripheral speed of the stabilizing rolls is set at 10 to 90% or at least 120% of the passing speed of the coated steel strip, a coated steel strip excellent in appearance can be produced.

In the production of the coated steel strip of the present invention, stabilizing rolls having necessary surface modes (surface roughness, surface hardness) are rotated at a peripheral speed different from the passing speed of the coated steel strip, and contacted with a preplating layer and/or coating layer being formed thereon.

The direct result is thought to be as follows: adhesion of flux to the surface of the stabilizing rolls is prevented; and a coating layer excellent in appearance is formed.

Moreover, on the other hand, the following may be concluded from the results of glow discharge spectroscopy: the contact of the stabilizing rolls acts on the preplating layer, on the coating layer being formed thereon, and in some cases on the base steel strip to some extent so that the sputtering time (T1) at the peak of a Ni emission intensity line and the sputtering time (T2) at the inflection point of an Fe emission intensity line satisfy the relationship (T1≧T2) of the formula (1); and formation of a coating layer composed of a fine dendritic structure, that has no room for manifesting uneven luster, is promoted.

Although it is difficult at the present stage to clearly infer and explain the action of the stabilizing rolls that brings about the relationship of the formula (1) and that promotes the formation of the coating layer, the action may be inferred for the present in the following manner.

The inference is based on "one inference," and the explanation of the action of the stabilizing rolls mentioned above is not restricted to the theory. The development of further research and investigations on the action must be awaited.

Figure 4:
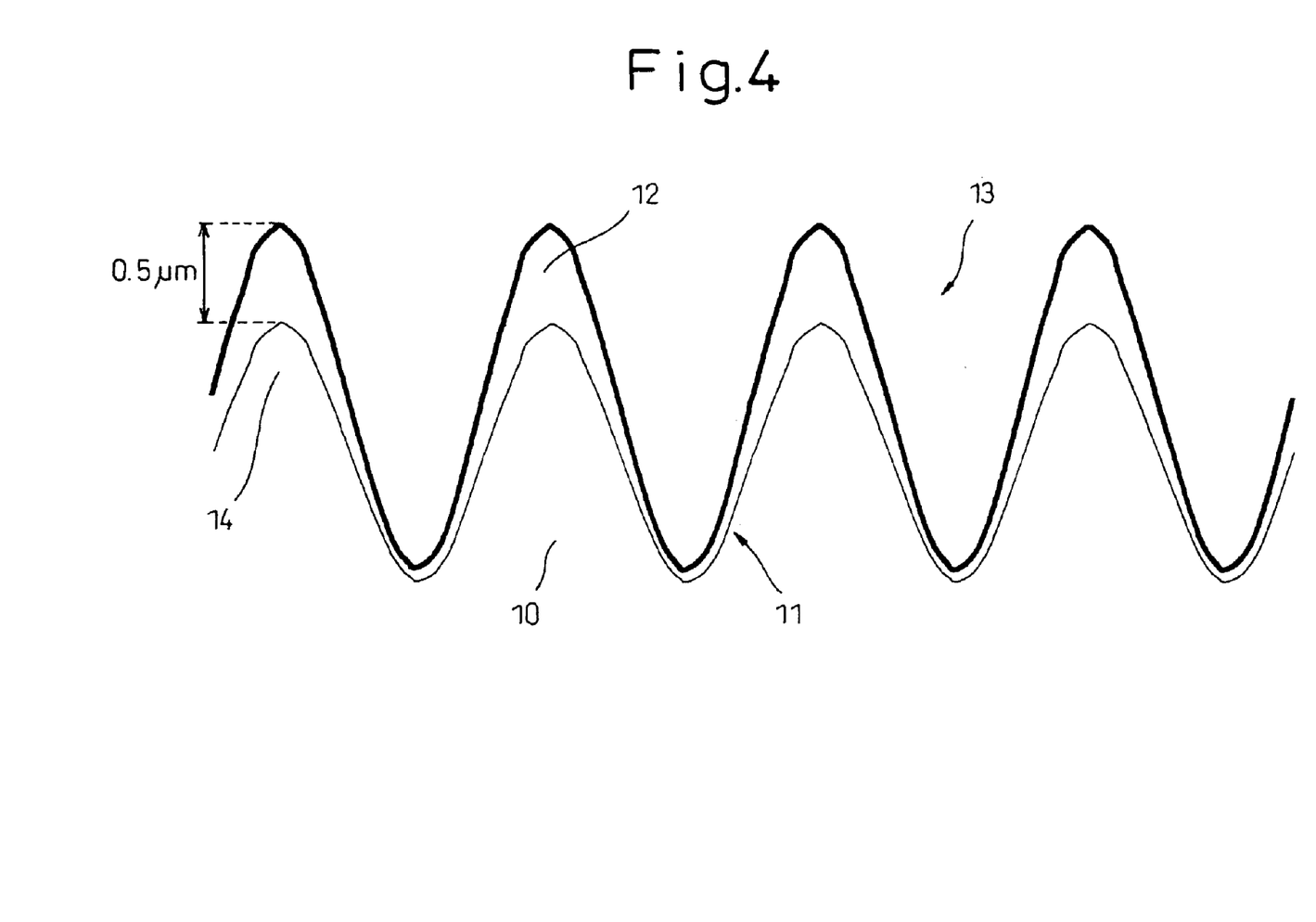
FIG. 4 is a view schematically showing the surface layer mode of a preplated steel strip immersed in a Sn-based metal coating bath.

First, FIG. 4 shows a state of a preplated steel strip that has a preplating layer 12 formed on the surface of a base steel strip 10 having a necessary surface roughness (0.8 to 2.5 $\mu$m in terms of Ra) and that is immersed in a coating bath of a Sn-based molten metal 13.

The preplating layer 12 is usually formed by electroplating. The layer 12 is thick in a protruded portion of the base steel strip (a maximum of about 0.5 $\mu$m in the base steel strip protruded portions), and thin in a recessed portion; an ultra-thin diffusion layer is formed between the preplating layer 12 and the base steel strip 10.

In addition, because the diffusion layer is extremely thin, the presence exerts no influence on the results of glow discharge spectroscopy.

After all, the surface of the preplated steel strip also becomes recessed and protruded according to the recesses and protrusions of the surface of the base steel strip, and a Sn-based metal coating layer is to be formed on the recessed and protruded preplating layer.

Figure 5:
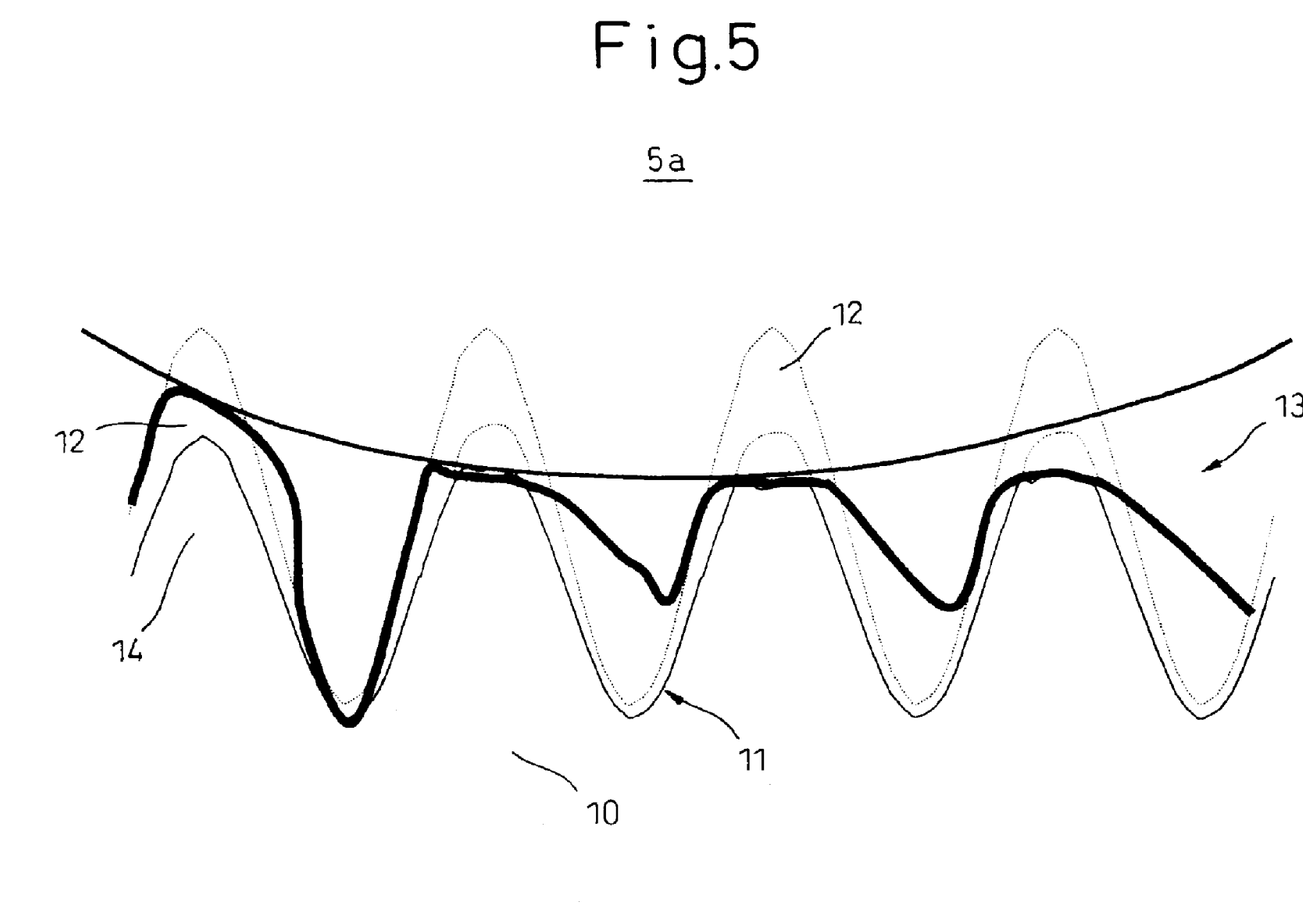
FIG. 5 is a view showing the surface layer mode of a preplating layer when a stabilizing roll is contacted with a coating layer.

In the course of forming the coating layer on the preplating layer during passing of the coated steel strip, the stabilizing rolls rotated at a peripheral speed different from the passing speed of the coated steel strip contact the coating layer; as shown in FIG. 5, a shearing force acts on the thicker preplating layer 12 (hereinafter referred to as the "preplating layer in protruded portions") formed on protruded portions 14 of the base steel strip 10 (hereinafter referred to as "protruded portions 14 of the steel strip"), and further on protruded portions of the steel strip.

As a result, the preplating layer 12 in protruded portions and the protruded portions 14 of the steel strip (see "dotted line portions" in the figure) are plastically deformed to fill in the recessed portions of the base steel strip 10 covered with the thin preplating layer.

As a result of the plastic deformation, the surface layer of the steel strip becomes a crushed recessed and protruded surface layer 15 (see a "thick line" in the figure), and the distribution of Ni and Fe in the coating layer including the preplating layer in the depth direction greatly changes in comparison with the distribution thereof in the coating layer with which the stabilizing rolls have not contacted.

The Sn-based metal coating layer 16 is formed on the crushed recessed and protruded surface layer 15 mentioned above. It is estimated that the following results are obtained by glow discharge spectroscopy of the coating layer because the distribution of Ni and Fe in the coating layer including the preplating layer is greatly changed in the depth direction: the peak of a Ni emission intensity line is located below the inflection point (position marked with Δ in the figure) of an Fe emission intensity line as shown in FIG. 6(b), that is, the sputtering times T1 and T2 show the magnitude relationship T1≧T2.

Figure 6:
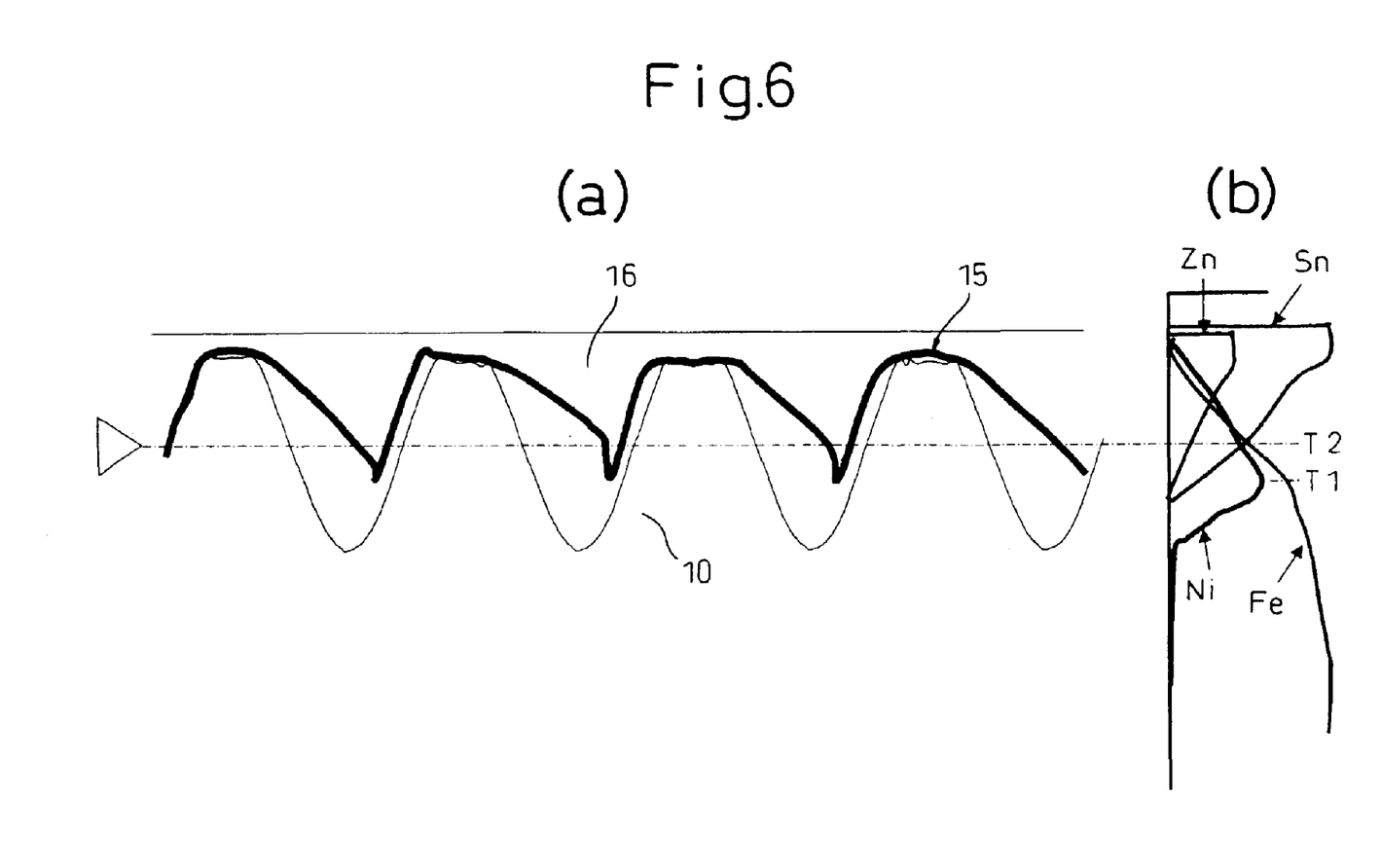
FIGS. 6(a) and 6(b) are views showing the surface layer mode of a coating layer contacted with a stabilizing roll, and the relationship between the surface layer mode and the results of glow discharge spectroscopy analysis of the surface layer mode.
Figure 7:
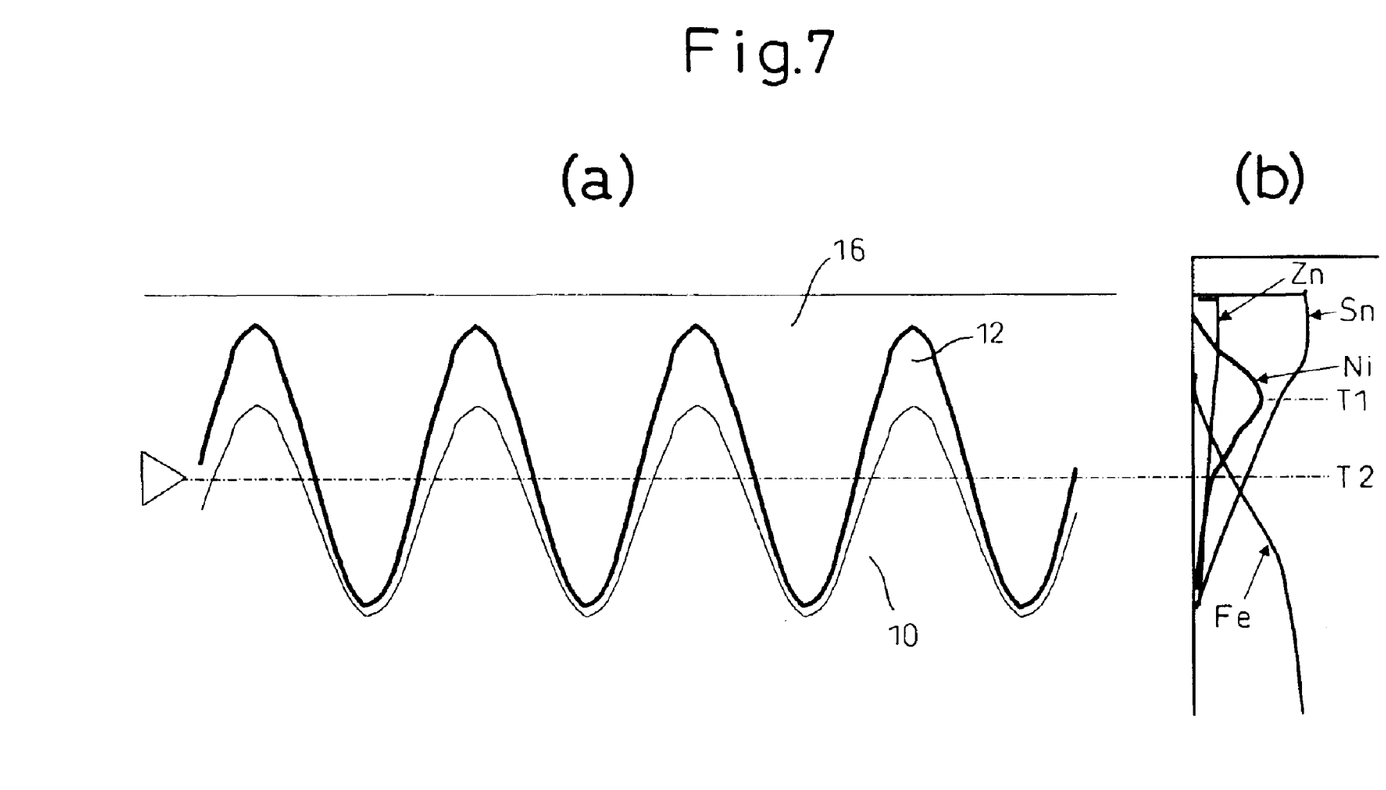
FIGS. 7(a) and 7(b) are views showing the surface layer mode of a coating layer not contacted with a stabilizing roll, and the relationship between the surface layer mode and the results of glow discharge spectroscopy of the surface layer mode.

In order to compare the results of the glow discharge spectroscopy shown in FIG. 6, FIG. 7 shows the results of glow discharge spectroscopy obtained when the stabilizing rolls rotated at the above peripheral speed are not contacted with the coated steel strip during passing of the coated steel strip.

As shown in FIG. 7, because the preplating layer is present in the coating layer, in a recessed and protruded state that traces the recesses and protrusions in the surface of the base steel strip, the peak of a Ni emission intensity line is located above the inflection point (position marked with Δ in the figure) of an Fe emission intensity line. That is, the relationship between sputtering times T1 and T2 is shown as follows: T1<T2.

It is thought that in the process of forming a Sn-based metal coating layer during passing of the coated steel strip, the characteristic difference in the results of the glow discharge spectroscopy of the coating layers including the preplating layers as explained above depends on the state of contact of the rolls rotating at a peripheral speed different from the passing speed of the coated steel strip.

Furthermore, the following is estimated: because the stabilizing rolls have a necessary surface hardness and a necessary surface roughness, the rolls not only plastically deform the preplating layer in protruded portions and the protruded portions of the steel strip but also form fine recesses and protrusions that function as sites for forming dendritic nuclei of the Sn-based metal on the surface of the preplating layer in protruded portions, and further on the surface of the Sn-based metal coating layer on the preplating layer in protruded potions when the coating layer is being formed thereon.

It is thus estimated that, as a result of the mechanical action of the stabilizing rolls, a Sn-based metal coating layer composed of fine dendritic structures, having no room for manifesting uneven luster, is formed.

In addition, when the Sn-based metal coating layer is being formed on the preplating layer, alloying of the Sn-based metal and preplating metal might be to proceed at the interface of the coating layer and the preplating layer.

Even when the alloying proceeds to form an alloyed layer, the mechanical action of the stabilizing rolls would plastically deform the protruded portions of the steel strip and the preplating layer in the protruded portions including the alloyed layer, and form fine recesses and protrusions that function as sites for forming the dendritic nuclei of the Sn-based metal on the surface of the coating layer being formed on the preplating layer in protruded portions.

That is, the effect of the invention is obtained without difficulties even when a diffusion layer is formed between the base steel strip and the preplating layer or an alloyed layer is formed between the preplating layer and the Sn-based metal coating layer.

Furthermore, the plastic deformation caused by the stabilizing rolls may expose the protruded portions of the steel strip to form portions with which the molten Sn-based metal is directly contacted.

Even in such a case, the stabilizing rolls having a necessary surface hardness and a necessary surface roughness are estimated to form fine recesses and protrusions that function as sites for forming Sn-based metal dendritic nuclei even on the exposed surface of the protruded portions of the steel strip.

In view of the findings associated with the results of glow discharge spectroscopy and those associated with the manifestation of uneven luster, a Sn-based metal-coated steel strip having a beautiful surface state without uneven luster and excellent in appearance can be produced in the present invention for the reasons explained above.

Moreover, no manifestation of uneven luster on the coating layer of the Sn-based metal-coated steel strip excellent in corrosion resistance increases the yield of the coated steel strip in its production, and greatly broadens the applications thereof.

The coated steel strip having no uneven luster in the present invention can be used for a fuel tank materials, materials for electrical appliances and architectural materials, and it can also used as external materials of products that require beautiful appearances as well as excellent corrosion resistance.

EXAMPLES

Next, examples of the present invention will be explained. However, the present invention is in no way restricted to the conditions under which examples were carried out.

Example 1

An extremely low carbon steel strip having a width of 1,200 mm, a thickness of 0.8 mm and a surface roughness Ra of 1.5 μm was plated with Ni, a Ni—Sn alloy, a Ni—Zn alloy, a Ni—Fe alloy or a Ni—Co alloy in an amount of 0.8 g/m² per side to give a preplated steel strip.

Using a coating apparatus shown in FIG. 1, the preplated steel strip was coated with an aqueous solution containing $ZnCl_2+NH_4Cl$ on both sides as a flux, conducted at a conducting speed of 50 m/min into a Sn—Zn alloy coating bath at 300° C., about 1,500 to 2,000 mm below the level of the coating bath, turned by a pot roll, contacted with stabilizing rolls, and withdrawn above the bath to give a coated steel strip.

In this case, two stabilizing rolls (each having a diameter of 200 mm, and a WC-Co thermally sprayed layer on the surface) having a surface roughness Ra of 0.05 μm and a surface hardness Hv of 1,050 were arranged at an upper and a lower position, respectively, 50 to 150 mm below the level of the coating bath with a pushing amount of 30 mm.

Coated steel strips were produced while the ratio of a passing speed of the steel strips in the bath of the molten metal to a peripheral speed of the stabilizing rolls was variously changed.

The distribution of each element in the depth direction of a coating layer was analyzed by glow discharge spectroscopy. The appearance, corrosion resistance and paintability of a coating layer were evaluated. Table 1 shows the results.

(2) Test of Paintability

A test piece, 70×150 mm, is spray painted with ACRYTK Black (trade name, manufactured by Yuko K. K.), baked at 140° C. for 20 minutes to form a painted film 20 μm thick. The painted film of the test piece is then cross cut, and the test piece is immersed in an aqueous 5% NaCl solution at 55° C. for 10 days. An adhesive tape is then stuck onto the cut side of the test piece, and then peeled off.

The secondary adhesion of the painted film is evaluated from the peeling width of the painted film on the basis of the following evaluation criteria.

[Evaluation Criteria]

◯: peeling width of up to 5 mm

Δ: peeling width exceeding 5 mm and up to 7 mm x: peeling width exceeding 7 mm

It is understood from Table 1 that when the T1 (sputtering time at the peak of a Ni emission intensity line)/T2

TABLE 1

| | Type of preplating | Amount of preplating (g/m² on one side) | Speed ratio of steel strip to stabilizing rolls | T1/T2 | Appearance (uneven luster) | Corrosion resistance | Paintability |
|---|---|---|---|---|---|---|---|
| Conventional materials | Ni | 0.8 | 95 | 0.82 | Present | ⊙ | ◯ |
| | Ni | 0.8 | 100 | 0.98 | Present | ◯ | ◯ |
| Invented materials | Ni | 0.8 | 10 | 1.47 | Absent | ⊙ | ◯ |
| | Ni | 0.8 | 25 | 1.47 | Absent | ⊙ | ◯ |
| | Ni | 0.8 | 50 | 1.46 | Absent | ⊙ | ◯ |
| | Ni | 0.8 | 80 | 1.14 | Absent | ⊙ | ◯ |
| | Ni | 0.8 | 82 | 1.16 | Absent | ⊙ | ◯ |
| | Ni | 0.8 | 87 | 1.07 | Absent | ⊙ | ◯ |
| | Ni | 0.8 | 90 | 1.06 | Absent | ⊙ | ◯ |
| | Ni | 0.8 | 120 | 1.17 | Absent | ⊙ | ◯ |
| | Ni | 0.8 | 150 | 1.45 | Absent | ⊙ | ◯ |
| | Ni—Sn | 0.8 | 50 | 1.46 | Absent | ⊙ | ◯ |
| | Ni—Zn | 0.8 | 80 | 1.14 | Absent | ⊙ | ◯ |
| | Ni—Fe | 0.8 | 82 | 1.16 | Absent | ⊙ | ◯ |
| | Ni—Co | 0.8 | 87 | 1.07 | Absent | ⊙ | ◯ |

Note:
Speed ratio of steel strip to stabilizing rolls = (peripheral speed of stabilizer rolls/passing speed of steel strip) × 100
T1/T2 = (sputtering time at the peak of a Ni emission intensity line) / (sputtering time at the inflection point of an Fe emission intensity line)

As to the appearance of a coating layer, the presence or absence of uneven luster was visually observed. As to the evaluation of the properties, a Sn—Zn-coated steel strip was degreased with alkali.

The steel strip was subjected to chemical conversion treatment to have about 300 mg/M² of chemical conversion coatings having a phenol resin and water dispersible silica as major components. The steel strip was then subjected to the following evaluation tests.

(1) Corrosion Test

A sample having been drawn (flat bottom cylinder 30 mm in diameter and 20 mm in depth) with a hydraulic forming testing machine is evaluated by the method of testing appearance and corrosion of automobile parts (JASO (Japanese Automobile Standards Organization) M610-92).

[Evaluation Condition] Test period: 150 cycles (50 days)

[Evaluation Criteria]

⊙: less than 0.1% of red rust formation

◯: at least 0.1% and less than 1% of red rust formation, or formation of white rustle Δ: at least 1% and less than 5% of red rust formation, or noticeable formation of white rustle x: at least 5% of red rust formation, or marked formation of white rustle (sputtering time at the inflection point of an Fe emission intensity line) ratio is at least 1 and up to 1.5, a Sn—Zn alloy coating layer having no uneven luster and an excellent appearance and excellent in corrosion resistance and paintability is formed.

It is understood that the T1/T2 ratio can be made at least 1 and up to 1.5 by setting the ratio of a passing speed of the steel strip to a speed of the stabilizing rolls at 10 to 92% or at least 120%, and that when the speed ratio is less than 50% or greater than 150%, the T1/T2 ratio becomes saturated.

According to the present invention, Sn-based metal-coated steel strips excellent in corrosion resistance and having a beautiful appearance without uneven luster can be produced with a good yield, and the application of the steel strips can be broadened.

Furthermore, the coated steel strips of the invention can be used for fuel tank materials, materials for electrical appliances and architectural materials, and they can also be used as external materials of products that require beautiful appearances as well as excellent corrosion resistance.

What is claimed is:

1. A Sn-based metal-coated steel strip excellent in appearance comprising a Ni-based metal preplating layer and a Sn-based metal coating formed thereon, and being characterized in that a Ni emission intensity line and an Fe emission intensity line obtained by glow discharge spectroscopy of the surface of the coated steel strip satisfy a relationship of the formula (1):

$$T1 \geq T2 \quad (1)$$

wherein T1 is a sputtering time at the peak of a Ni emission intensity line, and T2 is a sputtering time at the inflection point of an Fe emission intensity line.

2. The Sn-based metal-coated steel strip excellent in appearance according to claim 1, wherein T1 and T2 further satisfy a relationship of the formula (2):

$$1 \leq T1/T2 \leq 1.5 \quad (2).$$

3. The Sn-based metal-coated steel strip excellent in appearance according to claim 1 or 2, wherein the Ni-based metal is a metal selected from the group consisting of Ni, Ni—Sn alloys, Ni—Zn alloys, Ni—Fe alloys and Ni—Co alloys.

4. The Sn-based metal-coated steel strip excellent in appearance according to claim 1 to 2, wherein the Sn-based metal is a Sn—Zn-based alloy.

5. The Sn-based metal-coated steel strip excellent in appearance according to claim 1 to 2, wherein the Sn-based metal-coated steel strip is an extremely low carbon one.

6. The Sn-based metal-coated steel strip excellent in appearance according to claim 1 to 2, wherein the Sn-based metal-coated steel strip is for fuel tank materials.

7. The Sn-based metal-coated steel strip excellent in appearance according to claim 1 to 2, wherein the Sn-based metal-coated steel strip is for materials for electrical appliances.

8. The Sn-based metal-coated steel strip excellent in appearance according to any one of claims 1 to 2, wherein the Sn-based metal-coated steel strip is for architectural materials.

* * * * *

(12) EX PARTE REEXAMINATION CERTIFICATE (7064th)
United States Patent
Sugiyama et al.

(10) Number: US 6,908,693 C1
(45) Certificate Issued: Sep. 15, 2009

(54) SN-BASED METAL-COATED STEEL STRIP EXCELLENT IN APPEARANCE AND PROCESS FOR PRODUCING SAME

(75) Inventors: Seiji Sugiyama, Kitakyushu (JP); Teruaki Izaki, Kitakyushu (JP); Masao Kurosaki, Kitakyushu (JP); Yasuto Goto, Kitakyushu (JP); Yusho Oyama, Kitakyushu (JP); Tomohide Kamiyama, Kitakyushu (JP)

(73) Assignee: Nippon Steel Corporation, Chiyoda-Ku, Tokyo (JP)

Reexamination Request:
No. 90/009,184, Jun. 16, 2008

Reexamination Certificate for:
Patent No.: 6,908,693
Issued: Jun. 21, 2005
Appl. No.: 10/615,660
Filed: Jul. 9, 2003

(30) Foreign Application Priority Data

Sep. 10, 2002 (JP) .................................... 2002-263562
Dec. 27, 2002 (JP) .................................... 2002-381523

(51) Int. Cl.
*B32B 15/001* (2006.01)
*C22C 13/00* (2006.01)

(52) U.S. Cl. .................... 428/648; 427/433; 428/679; 428/939

(58) Field of Classification Search .................. None
See application file for complete search history.

(56) References Cited

U.S. PATENT DOCUMENTS

| | | | |
|---|---|---|---|
| 3,962,501 A | 6/1976 | Ohbu et al. | |
| 5,827,618 A | 10/1998 | Oyagi et al. | |
| 6,652,990 B2 | 11/2003 | Carey et al. | |

FOREIGN PATENT DOCUMENTS

JP  2001-355051  12/2001

OTHER PUBLICATIONS

Computer generated English Translation of JP 2001-355051.
English Abstract of JP 2001-355051.

*Primary Examiner*—Jerry D. Johnson (57) ABSTRACT

A Sn-based metal-coated steel strip excellent in appearance comprises a Ni-based metal (such as Ni, a Ni—Sn alloy, a Ni—Zn alloy, a Ni—Fe alloy and a Ni—Co alloy) preplating layer and a Sn-based metal (such as a Sn—Zn alloy) coating formed thereon, and is characterized in that a Ni emission intensity line and an Fe emission intensity line obtained by glow discharge spectroscopy of the surface of the coated steel strip satisfy a relationship of the formula: $T1 \geq T2$ wherein T1 is a sputtering time at the peak of a Ni emission intensity line, and T2 is a sputtering time at the inflection point of an Fe emission intensity line, or a relationship of the formulas: $T1 \geq T2$, and $1 \leq T1/T2 \leq 1.5$.

EX PARTE REEXAMINATION CERTIFICATE ISSUED UNDER 35 U.S.C. 307

THE PATENT IS HEREBY AMENDED AS INDICATED BELOW.

Matter enclosed in heavy brackets [ ] appeared in the patent, but has been deleted and is no longer a part of the patent; matter printed in italics indicates additions made to the patent.

AS A RESULT OF REEXAMINATION, IT HAS BEEN DETERMINED THAT:

Claims 1 and 4–8 are determined to be patentable as amended.

Claims 2 and 3, dependent on an amended claim, are determined to be patentable.

New claims 9–25 are added and determined to be patentable.

1. A Sn-based metal-coated steel strip excellent in appearance comprising a Ni-based metal preplating layer and a Sn-based metal coating formed thereon, and being characterized in that a Ni emission intensity line and an Fe emission intensity line obtained by glow discharge spectroscopy of the surface of the coated steel strip satisfy a relationship of the formula (1) *and said Sn-based metal coating having a fine dendritic structure*:

$$T1 \geq T2 \qquad (1)$$

wherein T1 is a sputtering time at the peak of a Ni emission intensity line, and T2 is a sputtering time at the inflection point of an Fe emission intensity line.

4. The Sn-based metal-coated steel strip excellent in appearance according to claim 1 [to] *or* 2, wherein the Sn-based metal is a Sn—Zn-based alloy.

5. The Sn-based metal-coated steel strip excellent in appearance according to claim 1 [to] *or* 2, wherein the Sn-based metal-coated steel strip is an extremely low carbon one.

6. The Sn-based metal-coated steel strip excellent in appearance according to claim 1 [to] *or* 2, wherein the Sn-based metal-coated steel strip is for fuel tank materials.

7. The Sn-based metal-coated steel strip excellent in appearance according to claim 1 [to] *or* 2, wherein the Sn-based metal-coated steel strip is for materials for electrical appliances.

8. The Sn-based metal-coated steel strip excellent in appearance according to [any one of claims] *claim* 1 [to] *or* 2, wherein the Sn-based metal-coated steel strip is for architectural materials.

*9. A Sn-based metal-coated steel strip excellent in appearance comprising a Ni-based metal preplating layer and a Sn-based metal coating formed thereon, and being characterized in that a Ni emission intensity line and an Fe emission intensity line obtained by glow discharge spectroscopy of the surface of the coated steel strip satisfy a relationship of the formula (1) and said Sn-based metal coating having a fine dendritic structure:*

$$T1 \geq T2 \qquad (1)$$

*wherein said Sn-based metal-coated steel strip is produced by a process comprising the steps of, in a sequence, preplating Ni-based metal on the steel strip, applying a flux layer on the steel strip, and then immersing in a Sn-based metal coating bath,*

*arranging one or more stabilizing roll(s), rotating at a peripheral speed different than a passing speed and/or a withdrawing speed of the coated steel strip, said one or more stabilizing roll(s) located below the coating bath surface,*

*said one or more stabilizing roll(s) contacting with the preplating layer and withdrawing the coated steel strip from the coating bath,*

*wherein T1 is a sputtering time at the peak of a Ni emission intensity line, and T2 is a sputtering time at the inflection point of an Fe emission intensity line.*

*10. The Sn-based metal-coated steel strip excellent in appearance according to claim 9, wherein T1 and T2 further satisfy a relationship of the formula (2):*

$$1 \leq T1/T2 \leq 1.5 \qquad (2).$$

*11. The Sn-based metal-coated steel strip excellent in appearance according to claim 9 or 10, wherein the Ni-based metal is a metal selected from the group consisting of Ni, Ni—Sn alloys, Ni—Zn alloys, Ni—Fe alloys and Ni—Co alloys.*

*12. The Sn-based metal-coated steel strip excellent in appearance according to claim 9 or 10, wherein the Sn-based metal is a Sn—Zn-based alloy.*

*13. The Sn-based metal-coated steel strip excellent in appearance according to claim 9 or 10, wherein the Sn-based metal-coated steel strip is an extremely low carbon one.*

*14. The Sn-based metal-coated steel strip excellent in appearance according to claim 9 or 10, wherein the Sn-based metal-coated steel strip is for fuel tank materials.*

*15. The Sn-based metal-coated steel strip excellent in appearance according to claim 9 or 10, wherein the Sn-based metal-coated steel strip is for materials for electrical appliances.*

*16. The Sn-based metal-coated steel strip excellent in appearance according to claim 9 or 10, wherein the Sn-based metal-coated steel strip is for architectural materials.*

*17. A Sn-based metal-coated steel strip excellent in appearance comprising a Ni-based metal preplating layer and a Sn-based metal coating formed thereon, and being characterized in that a Ni emission intensity line and an Fe emission intensity line obtained by glow discharge spectroscopy of the surface of the coated steel strip satisfy a relationship of the formula (1) and said Sn-based metal coating having a fine dendritic structure:*

$$T1 \geq T2 \qquad (1)$$

*wherein said Sn-based metal-coated steel strip is produced by a process comprising the steps of, in a sequence, preplating Ni-based metal on the steel strip, applying a flux layer on the steel strip, and then immersing in a Sn-based metal coating bath,*

*arranging two or more stabilizing rolls provided in an upper and lower position and offset from each other, rotating at a peripheral speed different from a passing speed of the coated steel strip and pushing against a* withdrawing line within a given distance, said two or more stabilizing rolls located below the coating bath surface, said two or more stabilizing rolls contacting with the pre-plating layer and withdrawing the coated steel strip from the coating bath, wherein T1 is a sputtering time at the peak of a Ni emission intensity line, and T2 is a sputtering time at the inflection point of an Fe emission intensity line.

18. The Sn-based metal-coated steel strip excellent in appearance according to claim 17, wherein T1 and T2 further satisfy a relationship of the formula (2):

$$1 \leq T1/T2 \leq 1.5 \quad (2).$$

19. The Sn-based metal-coated steel strip excellent in appearance according to claim 17 or 18, wherein the Ni-based metal is a metal selected from the group consisting of Ni, Ni—Sn alloys, Ni—Zn alloys, Ni—Fe alloys and Ni—Co alloys.

20. The Sn-based metal-coated steel strip excellent in appearance according to claim 17 or 18, wherein the Sn-based metal is a Sn—Zn-based alloy.

21. The Sn-based metal-coated steel strip excellent in appearance according to claim 17 or 18, wherein the Sn-based metal-coated steel strip is an extremely low carbon one.

22. The Sn-based metal-coated steel strip excellent in appearance according to claim 17 or 18, wherein the Sn-based metal-coated steel strip is for fuel tank materials.

23. The Sn-based metal-coated steel strip excellent in appearance according to claim 17 or 18, wherein the Sn-based metal-coated steel strip is for materials for electrical appliances.

24. The Sn-based metal-coated steel strip excellent in appearance according to claim 17 or 18, wherein the Sn-based metal-coated steel strip is for architectural materials.

25. The Sn-based metal coated steel strip excellent in appearance according to claim 1, wherein protruded portions from the steel strip directly contact the Sn-based metal coating.

* * * * *